Figure 1:
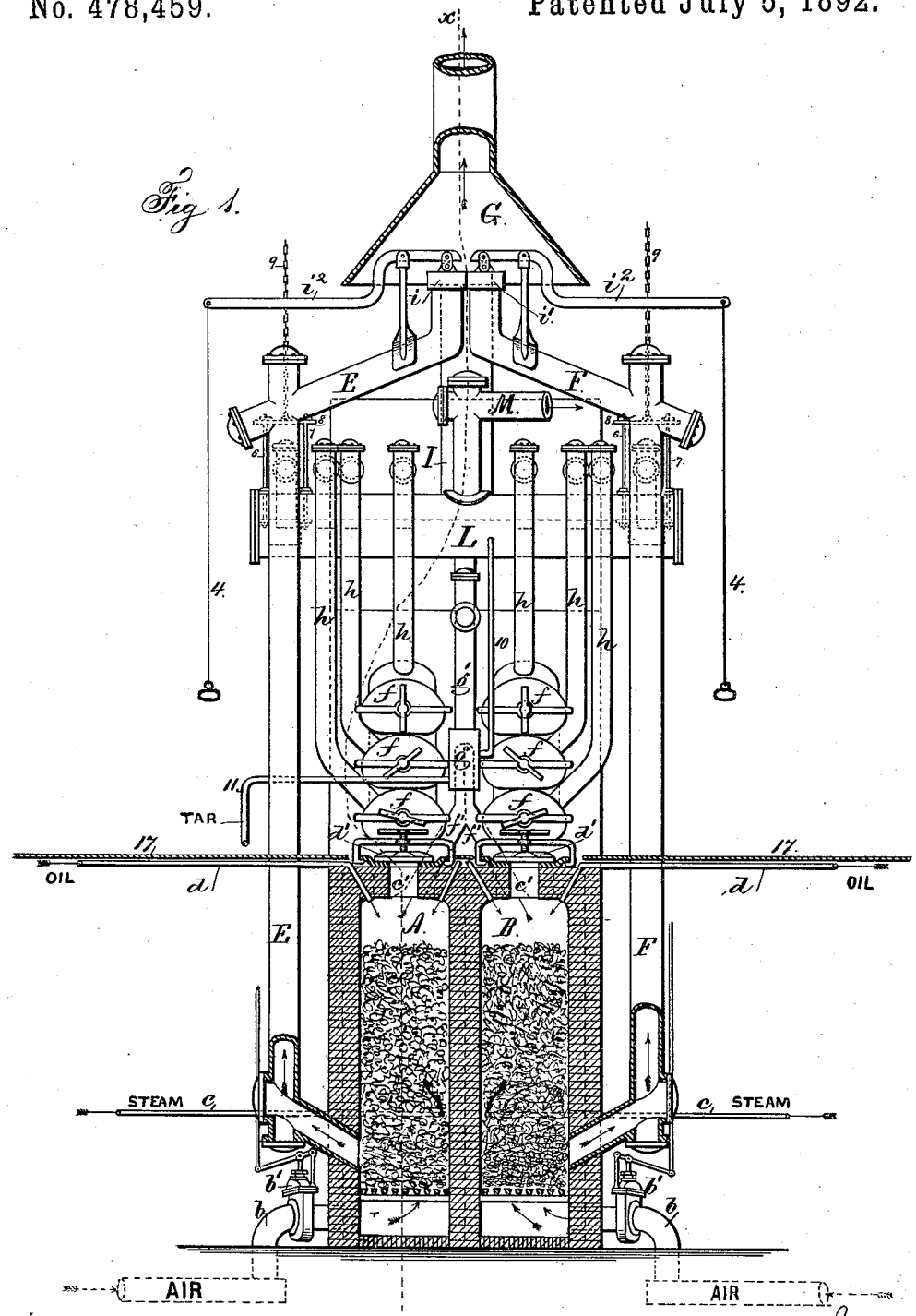

(No Model.)   H. M. PIERSON.   4 Sheets—Sheet 1.
METHOD OF MANUFACTURING GAS.

No. 478,459.   Patented July 5, 1892.

Witnesses
Harold Serrell
Chas H Smith

Inventor
Henry M. Pierson
per Lemuel W. Serrell
Atty.

(No Model.) 4 Sheets—Sheet 2.

H. M. PIERSON.
METHOD OF MANUFACTURING GAS.

No. 478,459. Patented July 5, 1892.

Witnesses
Harold Serrell
Chas H Smith

Inventor
Henry M. Pierson
per Lemuel W. Serrell
Atty

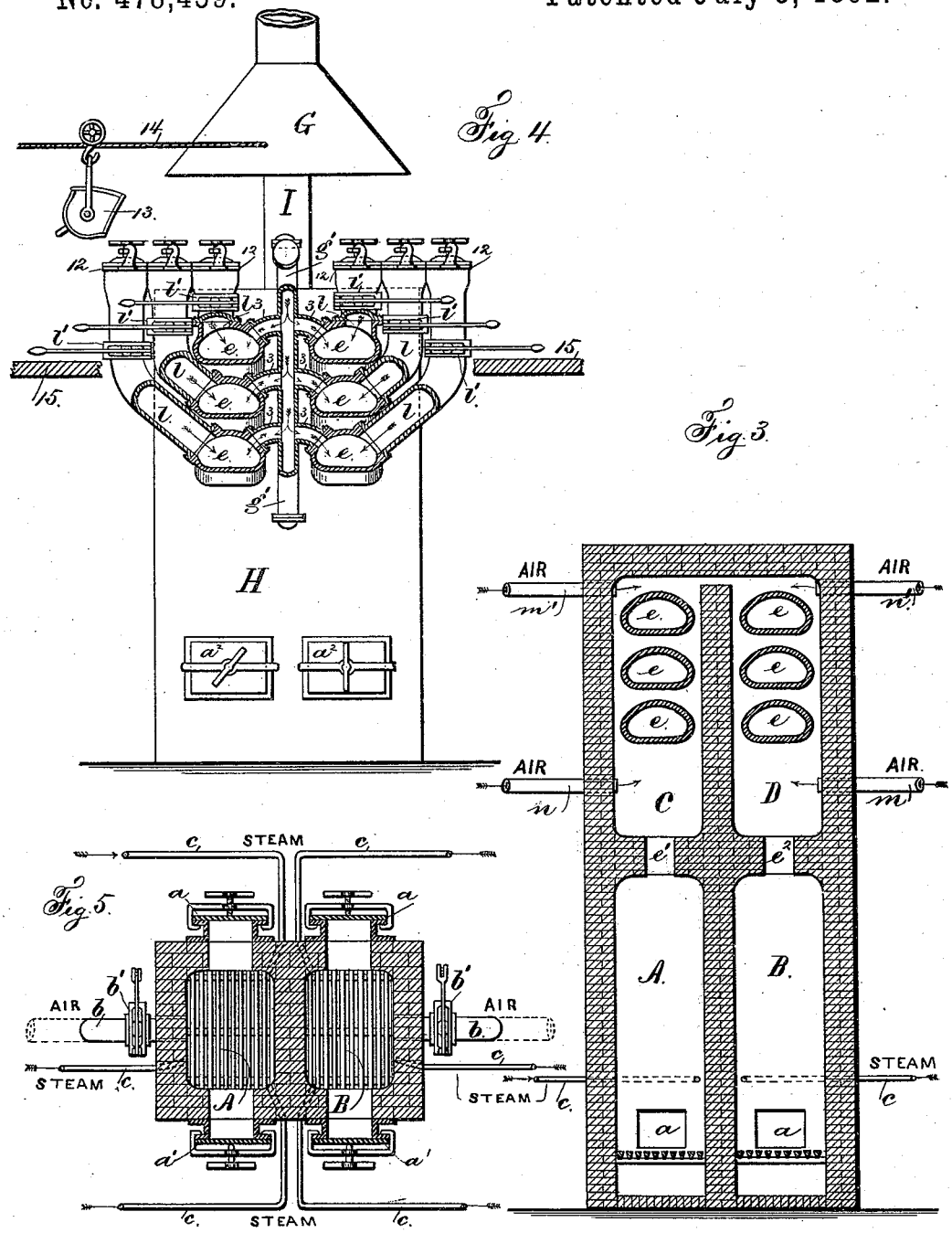

(No Model.) 4 Sheets—Sheet 4.
H. M. PIERSON.
METHOD OF MANUFACTURING GAS.
No. 478,459. Patented July 5, 1892.
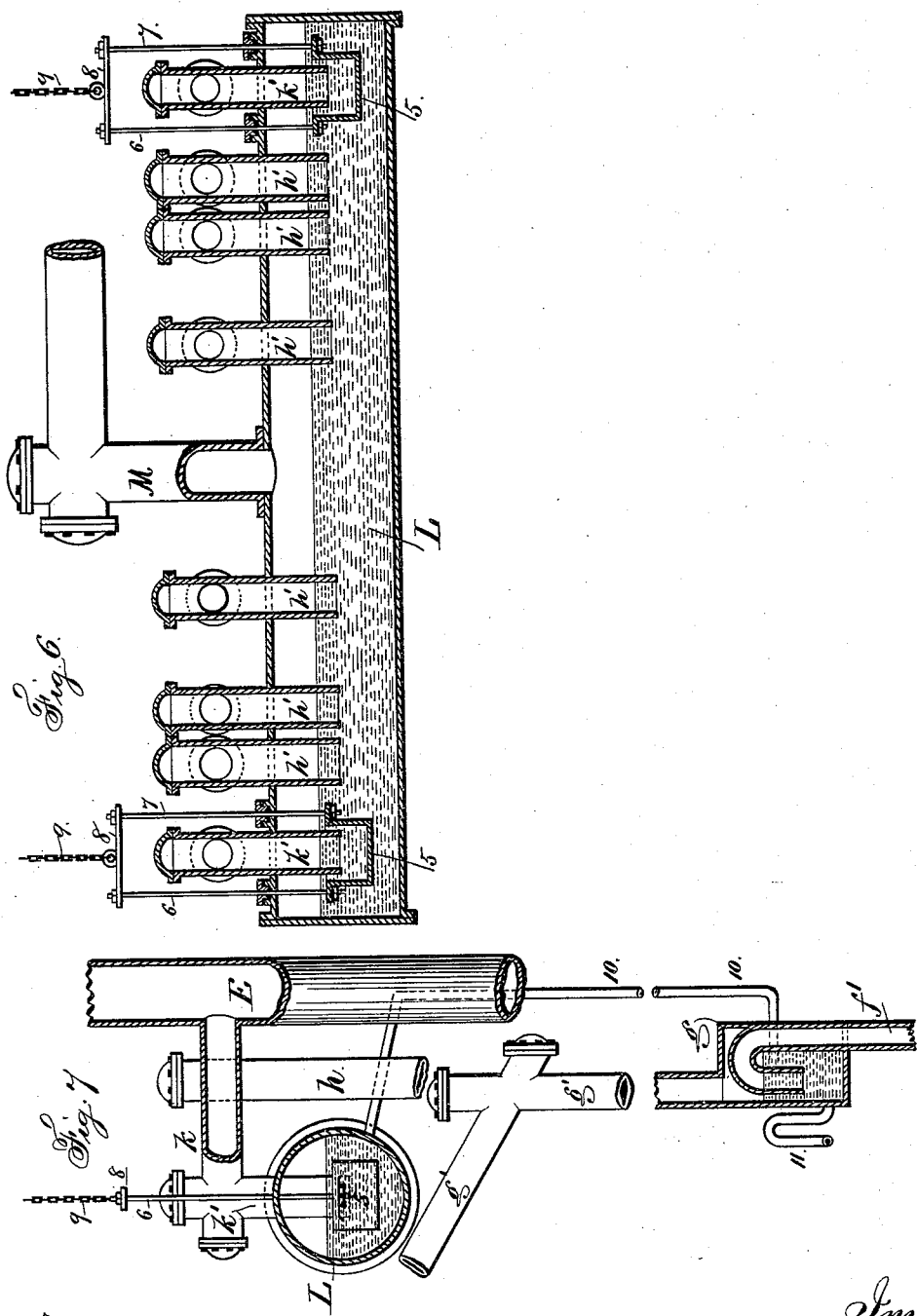

UNITED STATES PATENT OFFICE.

HENRY M. PIERSON, OF BROOKLYN, NEW YORK.

METHOD OF MANUFACTURING GAS.

SPECIFICATION forming part of Letters Patent No. 478,459, dated July 5, 1892.

Application filed December 30, 1891. Serial No. 416,552. (No model.)

*To all whom it may concern:*

Be it known that I, HENRY M. PIERSON, a citizen of the United States, residing at Brooklyn, in the county of Kings and State of New York, have invented a new and useful Improvement in Methods of Manufacturing Gas, of which the following is a full, clear, and exact description.

Natural gas, the hottest gas extensively used for manufacturing purposes, is fast becoming exhausted; and the object of my present invention is to produce an artificial gas to replace natural gas, and a gas to replace natural gas must be a combination of the hottest known manufactured gases produced cheaply and in a simple apparatus.

My invention relates to a method of manufacturing a permanent compound gas in which the gases comprising the same are made in part continuously and in part alternately without the use of the usual refractory-material fixing-chamber, and in carrying out my invention I employ coal-gas which contains marsh-gas and hydrogen, water-gas which contains carbonic oxide and hydrogen, and oil-gas which contains olefiant gas, as these are the hottest known manufactured gases, and I manufacture these three gases in a peculiar and especially-designed apparatus and commingle said gases to form the desired permanent compound gas which is my substitute for natural gas.

In order to have this gas, which is a combination of the before-named gases, of the highest heating power, the same must be of a high candle-power, and the gas resulting from these gases commingled fills these requirements, which being the case allows the one gas to be used for both heating and lighting purposes delivered through one set of pipes, and as it has been found expensive to double pipe for the purpose of delivering the gases separately my improvement overcomes this objection.

I employ mechanical devices as far as possible in connection with the apparatus in carrying out the process for making these gases economically and continuously and commingling the same for use.

The coal-gas I make from coal delivered into inclined retorts externally heated, the gas passing from said retorts by stand-pipes through a hydraulic main and by pipes to and through washers, scrubbers, and purifiers to a holder The washers, scrubbers, purifiers, and holder are well-known devices and form no necessary portion of my invention, and consequently are not illustrated or described herein.

The water-gas I make by passing steam in the usual manner through a bed of incandescent combustible material, the resultant gas being conveyed through the coal-gas retorts during the process of distillation to become enriched by combining with the light tarry matters that usually pass over into the hydraulic main and are lost by commingling and passing off with the tar. This enriched water-gas then passes, with the coal-gas, through the hydraulic main, through washers, scrubbers, and purifiers to a holder.

The oil-gas I make by delivering liquid hydrocarbons onto a bed of red-hot combustible material and passing the resultant vapors down through said red-hot combustible material in said generator, thereby transforming the said vapors into the desired oil-gas, said gas then passing into the hydraulic main and through the same with the coal-gas and on through the washers, scrubbers, and purifiers to the holder, wherein all three gases inseparably commingle, forming the desired permanent compound gas—a substitute for natural gas.

Figure 2:
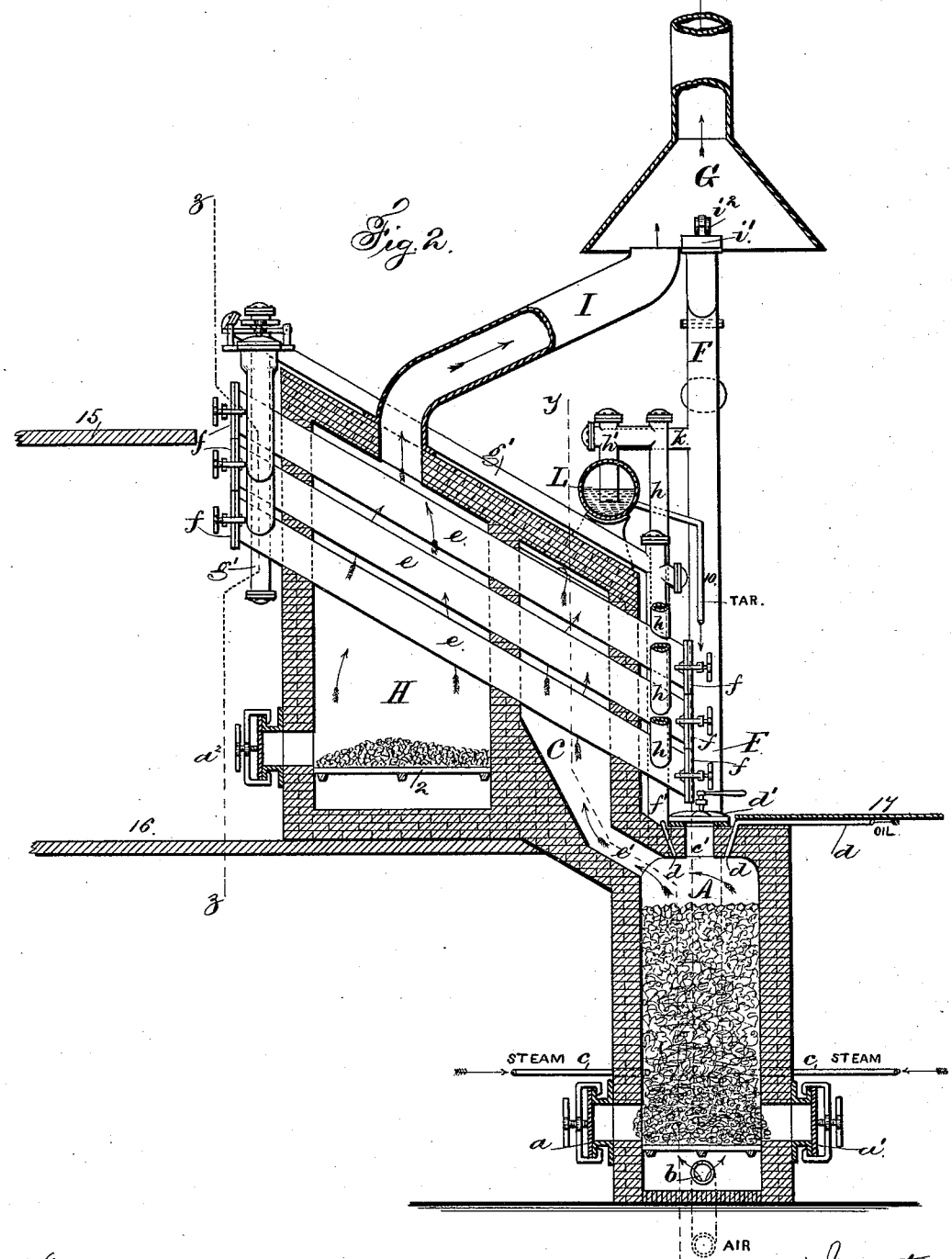

In the drawings, Figure 1 is an elevation and partial cross-section of my improved apparatus. Fig. 2 is a vertical section and partial elevation of the same at approximately the irregular line $x\,x$ of Fig. 1. Fig. 3 is a vertical section on the line $y\,y$ of Fig. 2. Fig. 4 is an elevation and partial section on approximately the line $z\,z$ of Fig. 2. Fig. 5 is a sectional plan above the generator grate-bars. Fig. 6 is a longitudinal section through the hydraulic main; and Fig. 7 is a cross-section through the end portion of the hydraulic main, stand-pipes, and tar-seal, as more particularly described hereinafter.

A B are the companion generating-furnaces, which are of usual character and constructed side by side and in which there are self-sealing doors $a\,a'$, ash-pits provided, also, with self-sealing doors, (not shown,) air-blast pipes $b$, with regulating-gates $b'$ for the inlet of air, steam-pipes $c$ for the inlet of steam, oil-pipes $d$ for the inlet of oil at various places, throats $c'$, and gas-tight covers $d'$, providing for the admission of fuel to the generating-furnaces. The walls of the companion generating-furnaces are continued upwardly and backwardly and with an inclined top to form the retort combustion-chambers C D and the retort-furnace H, between which there is a dividing-wall, through which the retorts pass. The retort combustion-chambers C D are connected with the generating-furnaces A B by throats $e'$ $e^2$, and they are separated by a wall that does not reach quite to the top. The retort-furnace H has a door $a^2$, grate-bars 2, and ash-pit, and a chimney-pipe I, connecting said furnace with the chimney G, and smoke-pipes E F also open into said chimney G, and their lower ends are connected to and open into the said generating-furnaces above the grate-bars and adjacent to the fire-zone.

The retorts $e$ are of usual character and extend through the furnace H and chambers C D and are set at an angle of about thirty degrees, the inclination being toward the generating-furnaces, so that the lower ends come above the throats $c'$ of the generating-furnaces. The respective ends of these retorts have gas-tight covers $f$ to close the same. Pipes $f''$ rise from the generating-furnaces A B and enter a tar-seal chamber $g$, and these pipes $f''$ may enter the tar-seal separately or come together with a central division extending into the said tar-seal chamber. A pipe $g'$ rises from said tar-seal and passes over the top of the retort chambers and furnace and down between the back and higher ends of said retorts, and at this point branches 3 from the pipe $g'$ enter all of the retorts $e$. No valves are employed on said pipes, for the reasons hereinafter stated in the description of the process. From the lower ends of said retorts $e$ vertical stand-pipes $h$ rise and dip-pipes $h'$ extend over therefrom into the hydraulic main L, and a pipe M passes from the top of the hydraulic main L away to the washers, scrubbers, and purifiers and to the holder. The tops of the smoke-pipes E F are fitted with weighted and tight-fitting valves $i$ $i''$, and I provide levers $i^2$ and depending rods 4 for operating said valves and removing from or replacing same upon the upper ends of said stand-pipes, or, in other words, for opening and closing said valves. Near the upper ends of said smoke-pipes E F are branch pipes $k$ and dip-pipes $k'$ from the same entering the hydraulic main L. Beneath the lower ends of the dip-pipes $k'$ within the hydraulic main are sealing-cups 5, and said cups are supported and guided in their position by pairs of vertical rods 6 7, which are united to said cups and pass up through suitable stuffing-boxes in the upper shell of the hydraulic main L, and they are connected at their upper ends by cross-heads 8, to each of which is a rope or chain 9, which by preference passes away and over a pulley to an accessible place where it can be made fast. The sealing-cups contain tar or such other products of distillation as are in the hydraulic main. The tar passes constantly from the hydraulic main L by a pipe 10 to the tar-seal $g$, and by a pipe 11 away from the tar-seal $g$ to the tar-well. I have not shown the tar-well, because it is a well-known device. The respective ends and elbows of all these various pipes are shown with caps for the thorough cleaning and care of such pipes.

I connect to the upper and higher ends of the respective retorts $e$ outside the wall of the retort-furnace H the coal-chutes $l$, (shown in Fig. 4,) and these chutes are provided with gas-tight valves $l'$ and self-sealing covers 12, and I provide and employ tipping-buckets 13, running on a rope or trackway 14 or equivalent structure, for conveying bituminous coal from a place of storage and delivering the same into the coal-chutes $l$. These valves $l'$ are shown in Fig. 4, but have been omitted in Fig. 2 for greater clearness. The upper portions of the coal-chutes above the valves $l'$ are filled with coal and the covers 12 closed. The valves $l'$ are then opened and the bituminous coal descends by gravity into and down through the inclined retorts, and the upper end of said retorts are constantly heated by the fires of the retort-furnace H, the products of combustion passing off by the chimney-pipe I and chimney G, and the lower ends of said retorts are intermittently heated by the firing up of the generating-furnaces.

I have represented floors at 15 16 17 for the attendants, which floors are conveniently placed for operating the mechanism in the way of filling the coal-chutes $l$, firing the retort-furnace H, and working the smoke-pipe valves $i$ $i'$ by the rods 4 and the air-valves $b'$ by the operating-rods.

I provide pipes $m$ $m'$ and $n$ $n'$, extending through the walls of the chambers C D, and the object of these pipes is to admit air within the chambers, so that the products of combustion in blowing up the generating-furnaces may be completely consumed by the addition of sufficient air for that purpose.

The operation of carrying on the manufacture of my permanent compound gas is as follows: The generating-furnaces are first charged with coke or other fuel and fired, and the retorts $e$ are charged with bituminous coal through the coal-chutes $l$ and valves $l'$, and the fires in the retort-chamber H are lighted and the upper ends of the retorts heated by a steady but low heat. The smoke-pipe valve $i'$ is now opened and the air-blast is admitted into the generating-furnace A and passes through the fuel therein, raising the same to incandescence, and the gases pass up the throat $e'$ into the retort-chamber C and around the retorts $e$, over the dividing-wall and down the retort-chamber D, and around the retorts therein, down the throat $e^2$, and down through the fuel in the generating-furnace B, raising the same to a dull-red-hot condition, and then up the smoke-pipe F and away by the chimney G. In this manner the lower ends of the retorts $e$ are heated by a high heat, which is intermittent with the blowing up of the generating-furnaces in alternate directions. During this firing-up operation air is admitted by the pipes $n\ n'$ into the chambers C D to completely burn the resulting gases into carbonic acid (complete combustion) before reaching and passing down through the second generating-furnace, thereby only heating, but not consuming, the fuel in this furnace. This is necessary, so that the fuel in the second generating-furnace is not heated above a dull-red heat, which is the required heat to effectually make the olefiant gas in my process. The air-pipes $m\ m'$ and $n\ n'$ in the chambers C D are operated alternately in pairs with the firing of the generating-furnaces and according to the direction of the firing, the pipes $n\ n'$ being used in firing the furnaces A B and the pipes $m\ m'$ in firing the furnaces B A. During this heating operation and together with the heat of the retort-furnace H the bituminous coal in the retorts $e$ is being distilled and converted into red-hot coke and giving off coal-gas, which contains marsh-gas and hydrogen, and said coal-gas passes by the stand-pipes $h$ and dip-pipes $h'$ into and through the hydraulic main and by the pipe M to the washers, scrubbers, and purifiers and to the common holder. The process of making coal-gas from bituminous coal in the retorts $e$ and making red-hot coke is continuous, the movement of the coal down the inclined retorts being accomplished steadily by the delivery of coal at the upper ends and the removal of red-hot coke from the lower ends through the covers $f$. This red-hot coke is delivered from the retorts periodically through the throats $c'$ into the generating-furnaces A B, as desired, for fuel, and the surplus is conveyed in any desired manner around to the retort-furnaces H for use there as fuel. After the generating-furnace A has been raised to incandescence the smoke-pipe valve $i'$ is closed and steam under pressure is admitted by the pipes $c$ into the generating-furnace A for the production of water-gas by passing said steam up through the bed of incandescent fuel in said furnace, and the resultant gas passes by one of the pipes $f'$ through the tar-seal $g$, up the pipe $g'$, and by the branch pipes 3 into the upper ends of all the retorts $e$. The gas then passes down through these coal-gas retorts $e$ during the process of distillation and in transit becomes enriched by taking up and combining with light tarry matters or hydrocarbons such light tarry matters as have heretofore usually passed over into the hydraulic main and are lost by commingling and passing off with the tar. The coal-gas is about eighteen-candle power and can carry only a certain per cent. of light tarry matters, and the surplus has heretofore been lost in the hydraulic main. By passing my water-gas through these retorts during the process of distillation and taking up these surplus matters I effect a saving and economically enrich the water-gas. I have discovered that no valves are needed in the pipes $g'$ or in the branch pipes 3 to the retorts $e$, because the retorts which are the hottest repel the entry of the water-gas to a great extent and the retorts that are the coolest admit said water-gas, and that nearly the entire volume of said water-gas passes through the retort most recently charged with bituminous coal, and which coal is directly after charging giving off the light tarry matters that I wish absorbed by the water-gas. The said retorts are charged in rotation at about stated intervals, so that each particular retort is recharged about every three hours—that is, where six retorts are employed, as shown in the drawings. This enriched water-gas then passes through the hot ends of said retorts and becomes fixed thereby and then passes from the retorts $e$, by the stand-pipes $h$ and dip-pipes $h'$, to and through the hydraulic main L by the pipe M to the washers, scrubbers, and purifiers to the common holder, and this occurs simultaneously with the manufacture and delivery of the coal-gas. The steam is shut off and the manufacture of water-gas is stopped in the furnace A after running the desired time, and one sealing-cup 5 is lowered in the hydraulic main and the generating-furnace A is not again used until after the next blowing-up operation.

I now manufacture oil-gas in the generating-furnace B, containing the fuel at dull-red heat, and previously unused, by delivering liquid hydrocarbons through the pipes $d$ onto this bed of fuel. The resulting vapors are made to pass down through this said bed of fuel, which changes the vapors into a fixed gas, and the gas passes by the smoke-pipe F and its branch pipe $k$ and dip-pipe $k'$ into and through the hydraulic main L, and by the pipe M to the washers, scrubbers, and purifiers to the common holder. The manufacture of coal-gas in the retorts $e$ is simultaneous with the manufacture of the oil-gas and the operations of blowing up the generating-furnaces, making water-gas and oil-gas follow one another, and are repeated in rotation, and the manufacture of coal-gas is carried on continuously with these operations.

Heretofore in the manufacture of olefiant gas it has been usual to convey the vapors away from the upper part of the generating-furnace into a fixing-chamber filled with checker-brick previously heated by internal combustion to produce the oil-gas; but I have discovered that by passing said oil-gas vapors down through a body of fresh unused fuel—such as that already heated to a dull-red heat in the generating-furnace in which the said vapors are made—the results in this case are far superior to the results heretofore obtained by passing said vapors through the fixing-chamber, as formerly employed. In this manner the said fuel is gradually and thoroughly charged with a carbonaceous deposit that materially assists combustion in again blowing up the fuel in said generating-furnace in repeating the operations. I am therefore enabled to use any kind of hydrocarbon oils or their residuums. I have also discovered that because of passing these oil vapors down through the fire I am enabled to use the most common, crude, and inexpensive hydrocarbon-oil residuum, as the same will make as much gas as more expensive oil, and the fire removes as a deposit in it the impurities which assist as fuel the reheating of the generator. In the common holder the coal-gas, water-gas enriched, and the oil-gas all inseparably commingle to form the desired permanent compound gas, adapted for both heating and lighting purposes, and to be delivered through one set of pipes for these purposes as a substitute for natural gas. After sufficient oil-gas has been made one sealing-cup 5 is drawn up to tightly seal the dip-pipe $k'$ above said cup 5, and the valve $i$ is opened from the top of the smoke-pipe E, and the cover $d'$ is removed from the top of the furnace B, and coke in sufficient quantity is drawn from the retorts $e$ and delivered into the furnace B as fuel therefor and the cover $d'$ closed. The air-blast is now turned on into the generating-furnace B, and the fuel therein is raised to incandescence, and the retort-chambers D and C are heated together by the completely-consumed products of combustion with the fuel in the generating-furnace A, which latter fuel is raised to dull-red heat, the products of combustion passing by the smoke-pipe E to the chimney G. After this the valve $i$ is closed and water-gas is made in the generating-furnace B, now filled with incandescent fuel, and then oil-gas is made in the furnace A now filled with fuel at a dull-red heat, and the operations back and forth with these generating-furnaces are constantly and intermittently repeated as herein described.

I would remark that during the operation of firing up the generators and afterward making water-gas the sealing-cups 5 are drawn up against the lower ends of the dip-pipes $k'$ to effectually seal the same, so that nothing enters the hydraulic main, and that during the making of oil-gas one sealing-cup 5 is lowered according to the generating-furnace in use for such purpose. I would also remark that during the manufacture of oil-gas in either generating-furnace no gas can pass the tar-seal $g$, because the same is greater than the depth of the seal in the hydraulic main at the dip-pipes $k'$, and in carrying out the processes herein specified by the peculiar apparatus described I do not employ the usual refractory-material fixing-chambers, but fix the gases as made and commingle them and form a permanent compound gas.

I claim as my invention—

1. The process of making a permanent compound gas, which consists in forming water-gas by passing steam through a bed of incandescent fuel, forming coal-gas by distilling bituminous coal, enriching the water-gas first formed by passing it through the hot retorts used in distilling the coal during the process of distillation, making oil-gas by delivering liquid hydrocarbons upon a bed of fuel at a dull-red heat, and passing the products downward through the same and conducting the gases to a common holder, where they are mixed and whereby a compound gas is formed without the use of the usual refractory-material fixing-chamber, substantially as described.

2. The process of making a permanent compound gas, which consists in blowing up companion beds of fuel alternately, the one to incandescence and the other to a dull-red heat, forming water-gas by passing steam through the said bed of incandescent fuel, forming coal-gas and coke by distilling bituminous coal, enriching the water-gas first formed with the surplus light tarry matters of the coal-gas retorts during the process of distillation by passing said water-gas through the hot coal-gas retorts and fixing the said enriched water-gas therein, making oil-gas by delivering liquid hydrocarbons upon the said bed of dull-red-hot fuel and passing the resulting hydrocarbon vapors down through the said bed of fuel, wherein they are converted into a fixed gas, and conveying all the gases to a common holder, where they are mixed inseparably, forming a permanent compound gas without the use of the usual refractory-material fixing-chamber, substantially as described.

3. The process of making a permanent compound gas, which consists in blowing up companion beds of fuel alternately, the one to incandescence and the other to a dull-red heat, forming a water-gas by passing steam through said bed of incandescent fuel, heating the feeding part of coal-gas retorts by relatively low heat and the delivery part by a high intermittent heat, and forming coal-gas and coke by distilling bituminous coal, enriching the water-gas first formed with the surplus light tarry matters of the coal-gas retorts during the process of distillation by passing said water-gas through the hot coal-gas retorts and fixing the said enriched water-gas therein, making oil-gas by delivering liquid hydrocarbons upon the said bed of dull-red-hot fuel, and passing the resulting hydrocarbon vapors down through said bed of fuel, wherein they are converted into a fixed gas and conducting all the gases to a common holder, where they are mixed inseparably, forming a permanent compound gas without the use of the usual refractory-material fixing-chamber and replenishing said beds of fuel with red-hot coke from the coal-gas retorts as fuel for repeating the operations, substantially as described.

Signed by me this 28th day of December, A. D. 1891.

HENRY M. PIERSON.

Witnesses:
 HAROLD SERRELL,
 GEO. T. PINCKNEY.